(12) United States Patent
Leung et al.

(10) Patent No.: US 8,270,411 B1
(45) Date of Patent: Sep. 18, 2012

(54) BANDWIDTH ALLOCATION BASED ON DORMANCY TRANSITIONS

(75) Inventors: Anthony Kit-yui Leung, Kansas City, MO (US); Ashish Bhan, Shawnee, KS (US); Jasinder Pal Singh, Olathe, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 383 days.

(21) Appl. No.: 12/635,892

(22) Filed: Dec. 11, 2009

(51) Int. Cl.
*H04L 12/28* (2006.01)
*H04L 12/56* (2006.01)
*H04J 3/16* (2006.01)

(52) U.S. Cl. .................. 370/395.21; 370/395.4; 370/468

(58) Field of Classification Search .................. None
See application file for complete search history.

(56) References Cited

U.S. PATENT DOCUMENTS

| 6,377,809 | B1* | 4/2002 | Rezaiifar et al. | 455/455 |
| 7,324,551 | B1* | 1/2008 | Stammers | 370/468 |
| 2007/0105576 | A1* | 5/2007 | Gupta et al. | 455/509 |
| 2008/0176577 | A1* | 7/2008 | Bourlas et al. | 455/454 |
| 2011/0122818 | A1* | 5/2011 | Dwyer et al. | 370/328 |

* cited by examiner

*Primary Examiner* — Gregory Sefcheck
*Assistant Examiner* — Ashley Shivers

(57) ABSTRACT

Embodiments disclosed herein provide systems and methods that allocate bandwidth to a mobile device based on the quantity of dormancy transitions performed by the mobile device. In a particular embodiment, an access node exchanges communications with a mobile device over a wireless link during an initial period of time. A control system determines the quantity of dormancy transitions by the mobile device during the initial period of time. After the initial period of time, the control system receives an access request from the mobile device to access the wireless link. The control system determines a bandwidth allocation on the wireless link for the mobile device based on the quantity of transitions that occurred during the initial period of time. The access node can then exchange data communications with the mobile device over the wireless link based on the bandwidth allocation.

18 Claims, 7 Drawing Sheets

US 8,270,411 B1

BANDWIDTH ALLOCATION BASED ON DORMANCY TRANSITIONS

TECHNICAL BACKGROUND

Wireless access nodes, such a cellular base stations, exchange wireless communications with mobile devices to provide the mobile devices with access to wireless communication networks. Wireless access nodes communicate with mobile devices using an amount of bandwidth allocated to each mobile device. Bandwidth is the amount of data that can be delivered over a communication link during a given amount of time. A wireless access node has a limited amount of data communication bandwidth that can be allocated between mobile devices. Therefore, as more mobile devices receive bandwidth allocations on the wireless access node, each mobile device receives a lower share of the total bandwidth available through the wireless access node.

One particular way to allocate bandwidth between mobile devices involves the proportional fairness algorithm. The proportional fairness algorithm allocates bandwidth between mobile devices based on the projected bandwidth usage of each device. This projection allows a mobile device that is using bandwidth in short bursts to be allocated more bandwidth for those short bursts while other mobile device are using data bandwidth more consistently. For example, a mobile device that is browsing the web would receive more bandwidth during page loads than a mobile device that is streaming media content. Consequently, a mobile device that is streaming media over the network is allocated less bandwidth relative to the amount of bandwidth allocated to a mobile device that may be engaged in excessive burst data usage, such as uncharacteristically frequent web page loads or a burst data attack on the network.

OVERVIEW

Embodiments disclosed herein provide systems and methods that allocate bandwidth to a mobile device based on the quantity of dormancy transitions performed by the mobile device. In a particular embodiment, an access node exchanges communications with a mobile device over a wireless link during an initial period of time. A control system determines the quantity of dormancy transitions by the mobile device during the initial period of time. After the initial period of time, the control system receives an access request from the mobile device to access the wireless link. The control system determines a bandwidth allocation on the wireless link for the mobile device based on the quantity of transitions that occurred during the initial period of time. The access node can then exchange data communications with the mobile device over the wireless link based on the bandwidth allocation.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
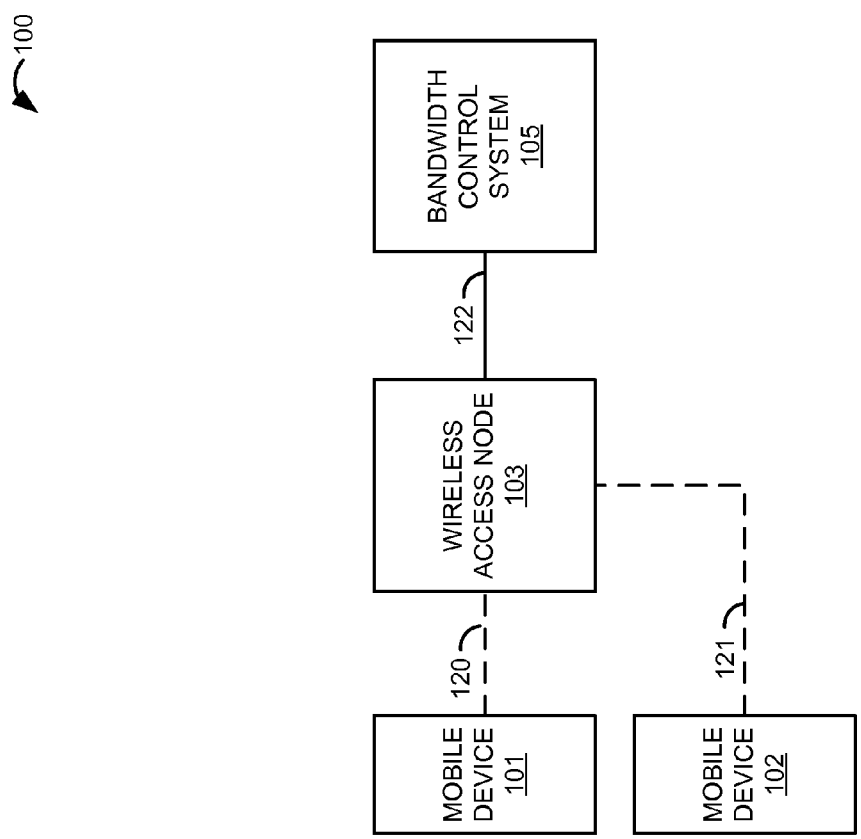
FIG. 1 illustrates a wireless communication system.

FIG. 1 illustrates wireless communication system 100. Wireless communication system 100 includes mobile device 101, mobile device 102, wireless access node 103, and bandwidth control system 105. Mobile device 101 and wireless access node 103 communicate over wireless link 120. Mobile device 102 and wireless access node 103 communicate over wireless link 121. Wireless access node 103 and bandwidth control system 105 communicate over communication link 122.

In operation, wireless access node 103 has a finite amount of bandwidth capacity for communicating with connected mobile devices. The finite amount of bandwidth is due to wireless access node 103 having a finite amount of data channels that may be used for communications with mobile device 101 and 102. The data channels may include time slots or frequency channels for transmitting data. Other types of data channels are possible. If a mobile device is to receive more bandwidth, then it is allocated more time slots, frequency channels, or a combination of both. Conversely, if a mobile device is to receive less bandwidth, then it is allocated fewer time slots, frequency channels, or a combination of both.

Wireless communication system 100 includes bandwidth control system 105 to allocate the finite bandwidth between mobile devices. Bandwidth control system 105 may use the proportional fairness algorithm to allocate the bandwidth of wireless access node 103 among all connected mobile devices. Alternatively, or in addition to the proportional fairness algorithm, wireless communication system 100 performs as described in FIG. 2 for bandwidth allocation on wireless access node 103 in order to minimize the adverse affects of excessive burst data usage.

Figure 2:
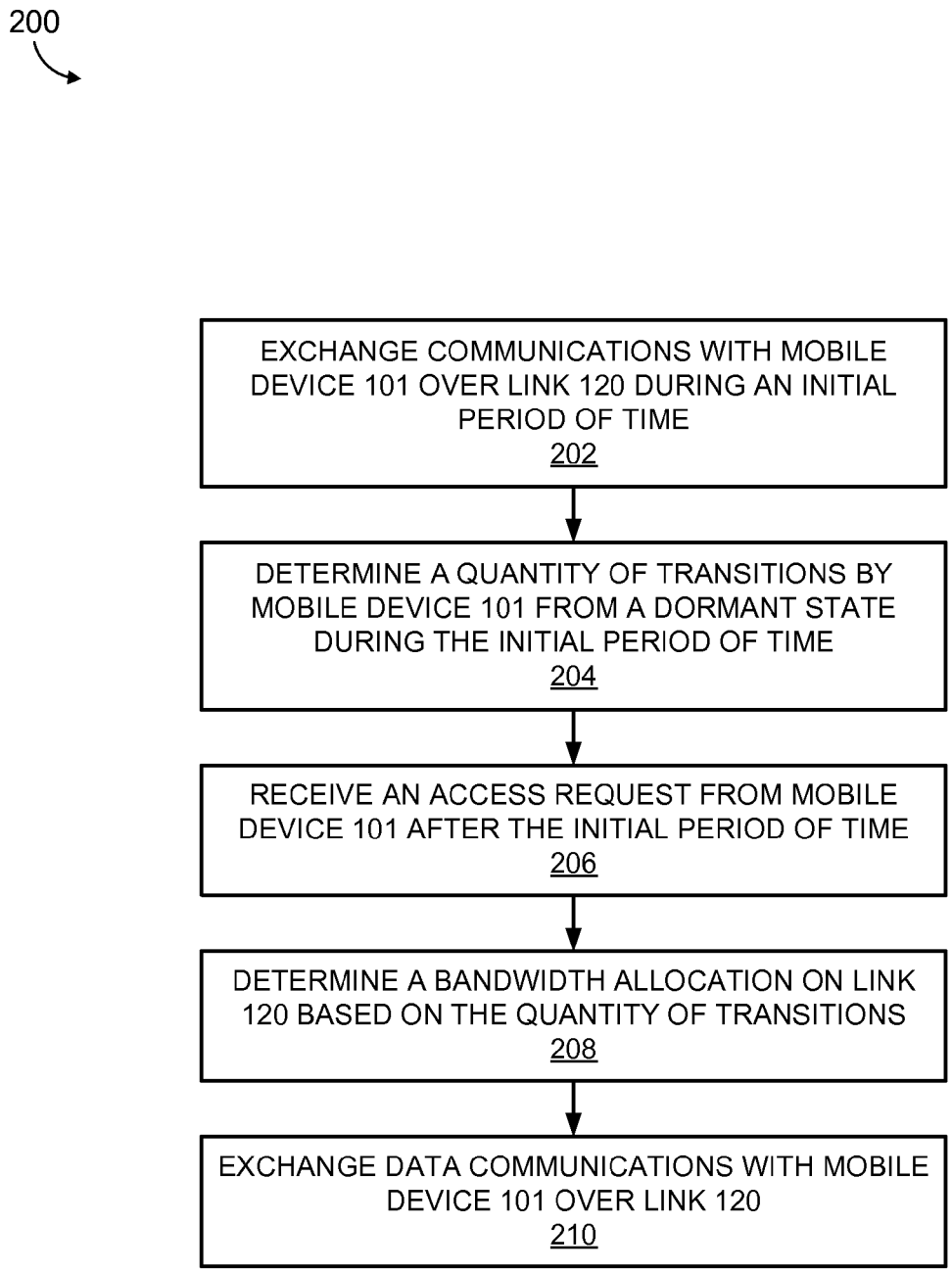
FIG. 2 is a block diagram illustrating the operation of a wireless communication system.

Referring to FIG. 2, mobile device 101 exchanges communications with wireless access node 103 over link 120 during an initial period of time (step 202). Mobile device 102 also exchanges communications with wireless access node 103. Additionally, there may be other devices exchanging communications with wireless access node 103 that are not shown for clarity. Consequently, the total data bandwidth of wireless access node 103 must be allocated between mobile devices 101, 102, and the other mobile devices communicating with wireless access node 103.

Bandwidth control system 105 determines a quantity of transitions by mobile device 101 from a dormant state during the initial period of time (step 204). The quantity of transitions from a dormant state to a non-dormant state may be determined using a variety of methods. One example method may determine the quantity of transitions by counting the number of access requests from mobile device 101 indicating that mobile device 101 is requesting data communication bandwidth on link 120 in order to exchange data communications.

Bandwidth control system 105 receives an access request from mobile device 101 after the initial period of time (step 206). The access request may be transferred by mobile device 101 after mobile device 101 transitions from a dormant state to a non-dormant state. Bandwidth control system 105 then determines a bandwidth allocation on link 120 for mobile device 101 based on the quantity of transitions (step 208).

Generally, the amount of bandwidth that mobile device 101 is allocated is inversely related to the number of dormancy transitions that were performed by mobile device 101 during the initial period of time. Thus, as the number of dormancy transitions increase, the allocated bandwidth decreases. Likewise, as the number of dormancy transitions decrease, the allocated bandwidth increases. Once an amount of bandwidth is determined by bandwidth control system 105, the bandwidth control system 105 allocates a number communication channels on wireless access node 103 corresponding to the allocated amount of bandwidth. Alternatively, after bandwidth control system 105 determines the amount of bandwidth, wireless access node 103 may allocate the number of communication channels corresponding to the allocated amount of bandwidth. Mobile device 101 may now exchange data communications over link 120 using the allocated bandwidth. Mobile device 102 may be allocated bandwidth with wireless access node 103 over link 121 using the same steps presented in FIG. 2 for mobile device 101.

Figure 3:
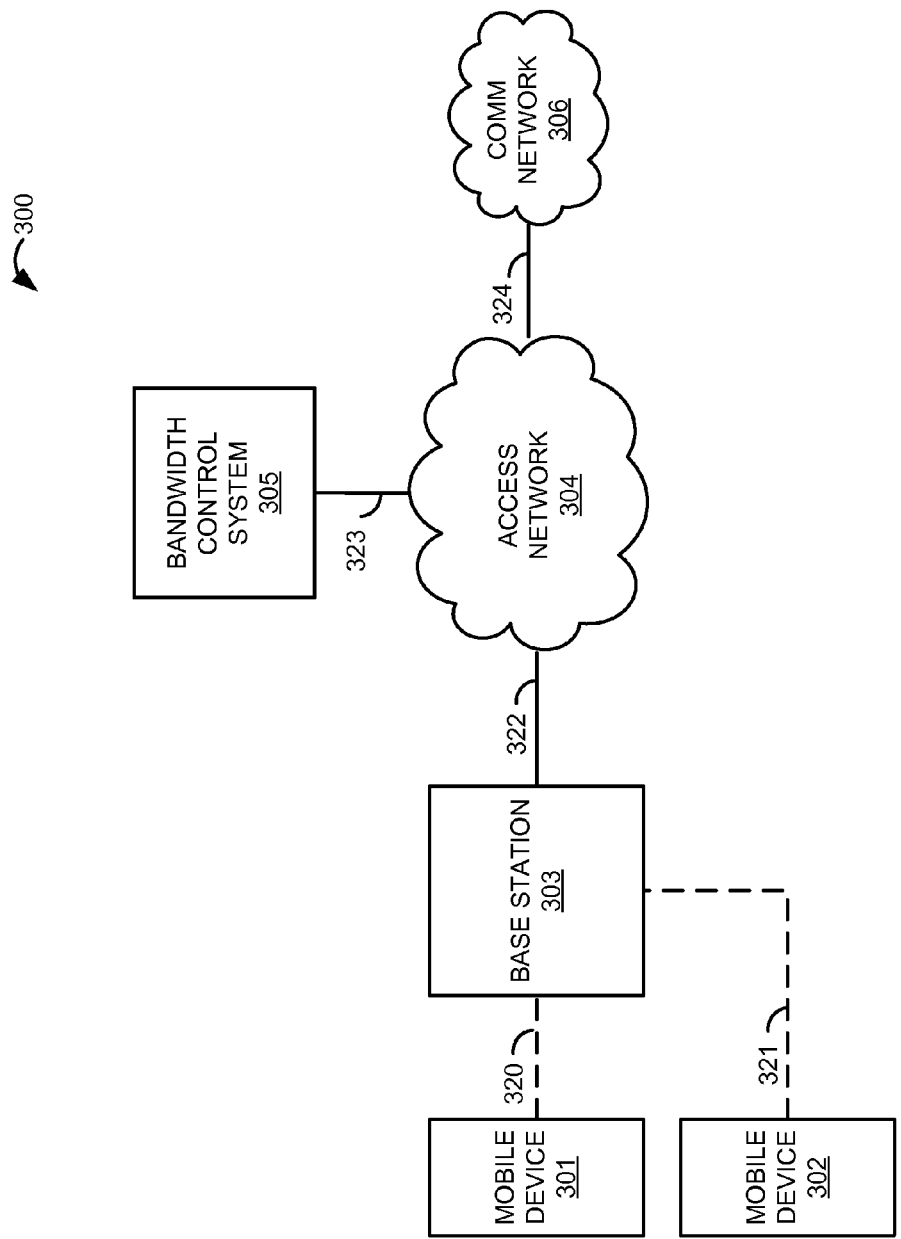
FIG. 3 illustrates a wireless communication system.

FIG. 3 illustrates wireless communication system 300. Wireless communication system 300 includes mobile device 301, mobile device 302, base station 303, access network 304, and bandwidth control system 305. Mobile device 301 and base station 303 communicate over wireless link 320. Mobile device 302 and base station 303 communicate over wireless link 321. Base station 303 and access network 304 communicate over communication link 322. Access network 304 and bandwidth control system 305 communicate over link 323.

Access network 304 may be any type of network or combination of networks configured to transfer communications between base station 303 and communication network 306. These communications may include voice, data, video, audio, or the like.

Bandwidth control system 305 is shown externally to access network 304 but may be part of access network 304 or integrated into a component of access network 304 or base station 303.

Communication network 306 may be any network or combination of networks configured to transfer communications between access network 304 and other communication devices. These communications may include voice, data, video, audio, or the like. Communication network 306 may include a wide variety of systems and devices such as links, switches, routers, gateways, session border controllers, or the like, used to route communications from access network 304 to communication systems and devices outside of access network 304.

Figure 4:
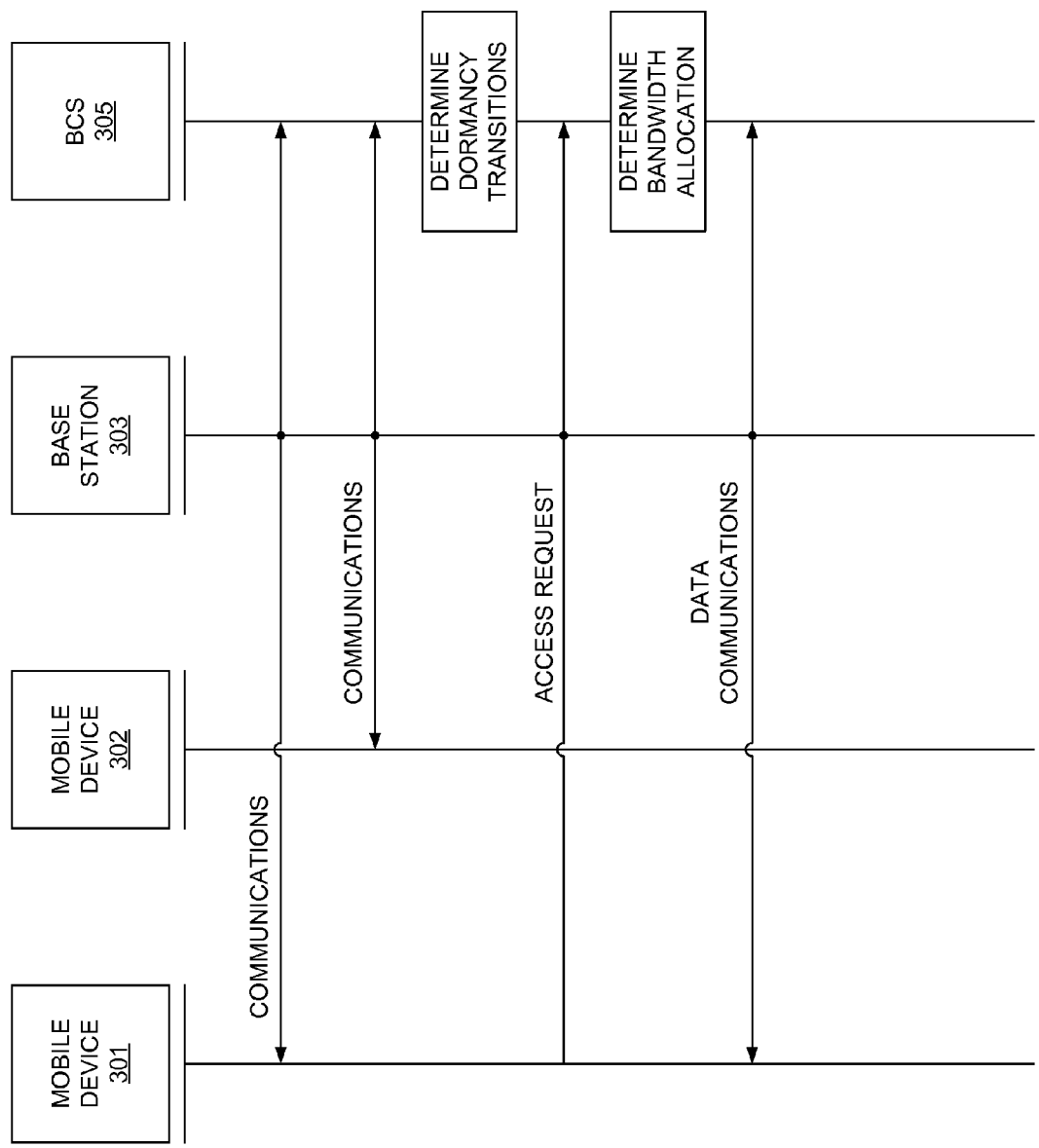
FIG. 4 is a sequence diagram illustrating the operation of a wireless communication system.

FIG. 4 is a sequence diagram that illustrates bandwidth allocation with respect to communication system 300 in FIG. 3. The sequence begins with mobile device 301 exchanging communications with base station 303 over link 320 using bandwidth allocated by bandwidth control system 305 during an initial period of time. During the same time period, mobile device 302 is also exchanging communications with base station 303 over link 321 using bandwidth allocated by bandwidth control system 305. Bandwidth control system 305 determines the number of times that mobile device 101 and mobile device 102 each perform dormancy transitions.

A dormancy transition occurs when a mobile device transitions from a dormant state to an active state. A dormancy transition may also be when a mobile device transitions from an active state to a dormant state. A dormant state may be a state in which the mobile device is not allocated data bandwidth on base station 303. The user interface of the mobile device does not need to be dormant for the device to be considered dormant for the purposes of this example. Dormancy transitions may be measured in many different ways. For example, bandwidth allocation system may detect when a mobile device becomes dormant or when the mobile device awakes from dormancy to an active state. Alternatively, bandwidth control system 305 may track the number of access requests for data communication bandwidth that were made by the mobile device during the initial period of time.

After the initial time period, mobile device 301 transfers an access request for data communication bandwidth with base station 303 over link 320. In response to receiving the access request, bandwidth control system 305 determines the amount of bandwidth to allocate to mobile device 301. Bandwidth control system 305 allocates bandwidth to mobile device 301 based on the quantity of dormancy transitions performed by mobile device 301 during the initial period of time. As stated above, the bandwidth is allocated by allocating a corresponding number of communication channels to link 320 between mobile device 301 and base station 303.

Additionally, the bandwidth allocation for mobile device 301 may depend on the data bandwidth used by other mobile devices communicating with base station 303 because the other devices also use the finite amount of total bandwidth available on base station 303. Therefore, bandwidth control system 305 must consider the amount of free bandwidth still available on base station 303, if any, and the amount of bandwidth that should be allocated away from the other mobile devices. Bandwidth control system 305 may determine to allocate bandwidth away from the other mobile devices based on the quantity of dormancy transitions performed by those devices during the initial period of time. As the quantity of dormancy transitions for one of the other mobile devices increases the more bandwidth can be allocated away from that mobile device.

After bandwidth control system 305 allocates bandwidth for mobile device 301, mobile device 301 is able to exchange data communications with base station 303 over the allocated bandwidth.

Figure 5:
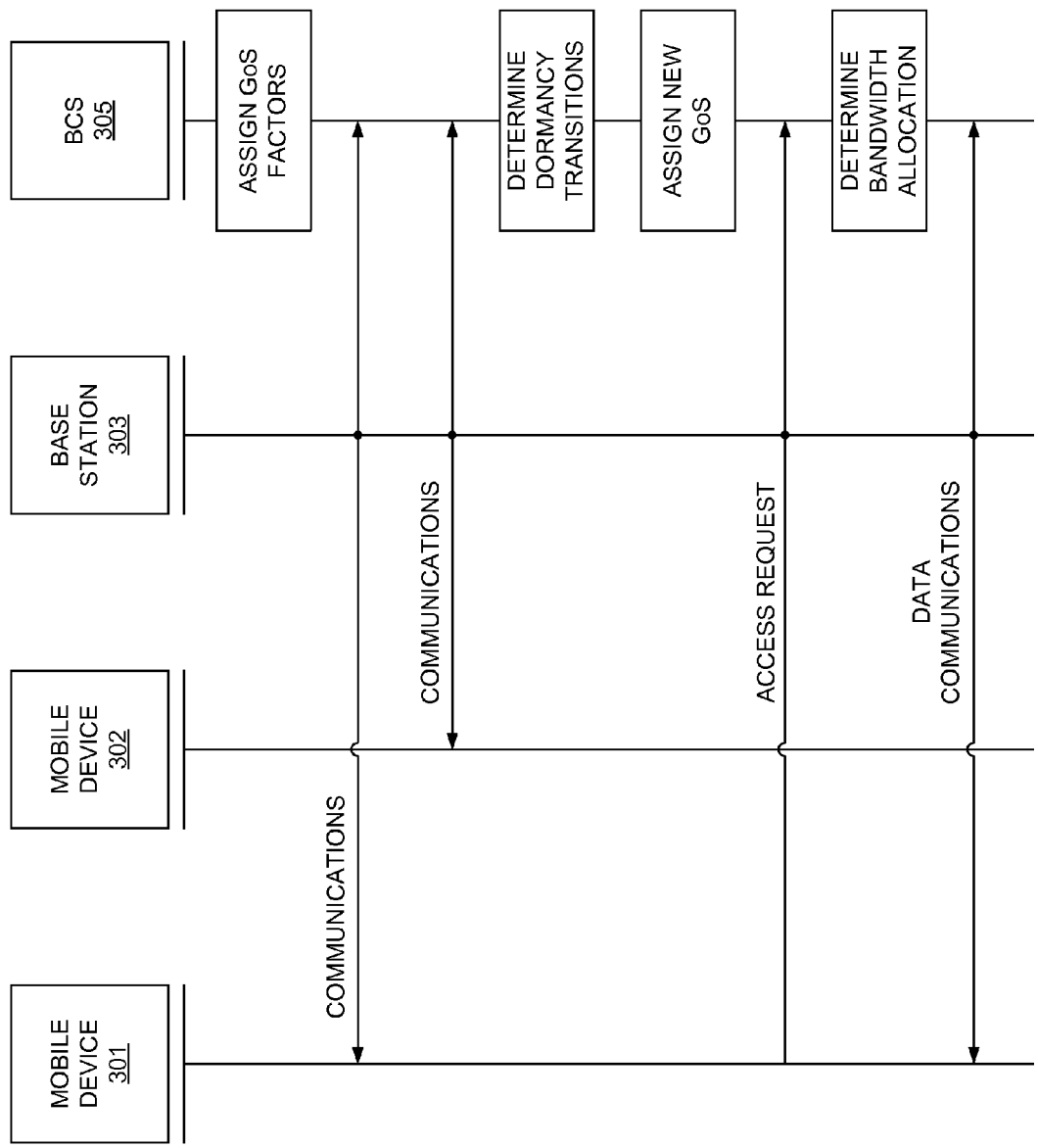
FIG. 5 is a sequence diagram illustrating the operation of the wireless communication system.

FIG. 5 is a sequence diagram that illustrates bandwidth allocation with respect to communication system 300 in FIG. 3. In this example, bandwidth control system 305 assigns an inter user grade of service factor (GoS) to mobile device 301 and mobile device 302. The GoS provides a reference value for bandwidth allocation system to consider when allocating the total data bandwidth of base station 303 between mobile device 301 and mobile device 302. Devices with higher GoS values have a higher priority for receiving assigned bandwidth than devices with lower GoS values. In general, the mobile devices with higher GoS values are allocated more bandwidth than mobile devices with lower GoS values.

In this example, the two mobile devices are initially assigned the same GoS. Mobile device 301 and mobile device 302 exchange communications with base station 303 during an initial period of time. The communications may be data communications, voice communications, control communications, or any other type of communications that may be exchanged on links 320 and 321. Bandwidth control system 305 determines the quantity of dormancy transitions performed by each of mobile devices 301 and 302 during the initial period of time, thus, determining the frequency of dormancy transitions.

After determining the quantity of data communication dormancy transitions, bandwidth control system 305 may assign a new GoS to mobile device 301 and mobile device 302 based on the frequency of dormancy transitions. A new GoS will be assigned to a mobile device if the frequency of dormancy transitions is greater than a predefined threshold value. Moreover, there may be multiple threshold values for various dormancy transition frequencies. Each threshold value coincides with a higher dormancy transition frequency. A different GoS is assigned to each mobile device for each threshold value. Therefore, the greater the frequency of dormancy transitions for a mobile device, the lower the GoS will be for the mobile device relative to the GoS of other devices.

In a first example, the quantity of dormancy transitions during the initial period of time is below the threshold value for both mobile device 301 and mobile device 302. Therefore, bandwidth control system 305 does not modify the GoS for either mobile device.

After the initial period of time, bandwidth control system 305 receives a data communication bandwidth request from mobile device 301. Bandwidth allocation system allocates bandwidth for mobile device 301 by allocating a corresponding number of communication channels between mobile device 301 and base station 303. Since both mobile devices have the same GoS, bandwidth control system 305 allocates bandwidth for mobile device 301 based on a proportional fairness algorithm. Generally, the proportional fairness algorithm allocates bandwidth between mobile devices based on their projected bandwidth usage. For example, the proportional fairness algorithm will give more bandwidth to a mobile device that is intermittently using data bandwidth, such as web browsing, than it will to a mobile device that is steadily using bandwidth, such as by streaming media. Thus, each mobile device is given its fair share of bandwidth whether the bandwidth is allocated in short bursts in the case of web browsing or over time in the case of media streaming.

In a second example, the quantity of dormancy transitions for mobile device 301 is greater than the threshold value and the quantity for mobile device 302 is less than the threshold. Therefore, bandwidth allocation system assigns mobile device 302 with a higher GoS than mobile device 301. The greater the discrepancy in GoS between mobile device 301 and 302, the more likely it is that the mobile device with the lower GoS is performing a burst data attack or is otherwise engaged in excessive burst data usage.

After the initial period of time, bandwidth control system 305 receives a data communication bandwidth request from mobile device 301. Bandwidth allocation system allocates bandwidth for mobile device 301. Since mobile device 301 has a lower GoS than mobile device 302, bandwidth control system 305 allocates more of the available bandwidth of base station 303 to mobile device 302 and less bandwidth to mobile device 301. Bandwidth control system 305 thereby mitigates the effects of any excessive burst data usage that mobile device 301 may be performing.

After bandwidth control system 305 allocates bandwidth for mobile device 301, mobile device 301 exchanges data communications with base station 303 over link 320 using the allocated bandwidth.

The frequency of dormancy transitions for mobile device 301 continues to be monitored by bandwidth control system 305 and the GoS for mobile devices 301 and 302 may be progressively changed over subsequent periods of time. Therefore, while the frequency of dormancy transitions for mobile device 301 may stay relatively constant, the GoS discrepancy between mobile device 301 and 302 may continue to increase if the constant frequency is above the threshold value.

Figure 6A:
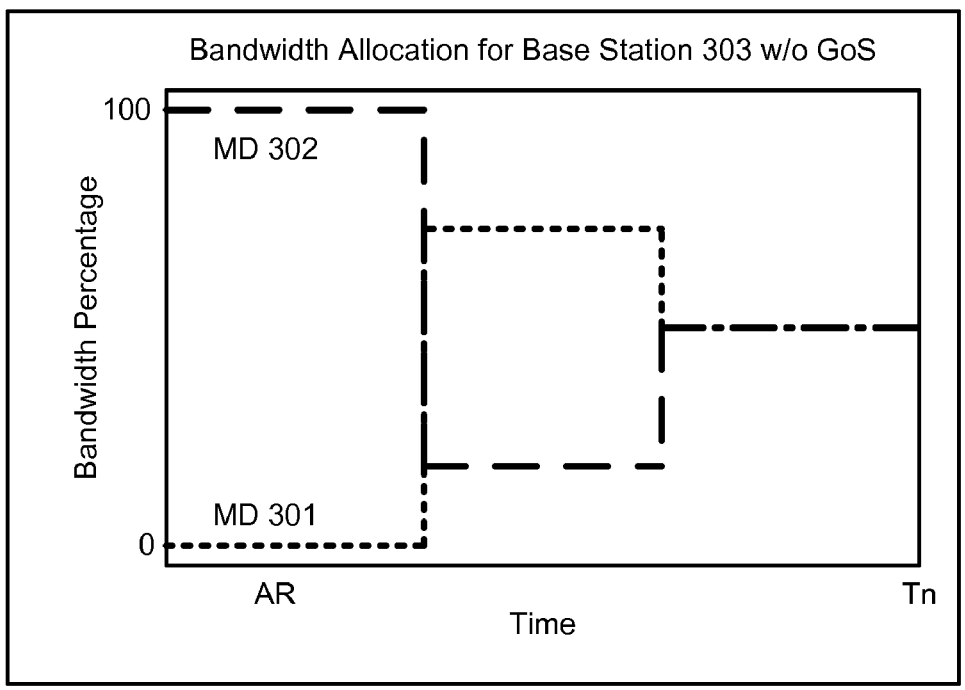
FIG. 6A illustrates a graph of allocated bandwidth using a proportional fairness algorithm.

FIG. 6A is a graph of an example of how the bandwidth of mobile device 301 and 302 is allocated based on a proportional fairness algorithm without considering the GoS for each device. The graph is not meant to be exact as to the percentage of available bandwidth that is allocated to each mobile device. Each mobile device may receive more or less bandwidth than what is depicted in the graph. Additionally, the time axis is not shown to scale.

The time axis of the graph begins at the end of the initial time period and ends at a later point in time. The access request from mobile device 301 is transferred to bandwidth control system 305 at a time near the end of the initial time period (denoted by AR on the graph). In this example, mobile device 302 is exchanging data communications with base station 303 at the time the access request is transferred from mobile device 301 to bandwidth control system 305.

Bandwidth allocation system processes the access request based on the proportional fairness algorithm to determine the amount of bandwidth to allocate to mobile device 301. In accordance with the proportional fairness algorithm, since mobile device 302 is already using bandwidth, mobile device 302 is projected to continue using a similar amount of bandwidth. Therefore, bandwidth control system 305 allocates more bandwidth to mobile device 301, which is not currently projected to use as much bandwidth as mobile device 302. The allocated bandwidth for mobile device 301 increases from 0 because mobile device 301 is now allocated bandwidth on base station 303. Consequently, the bandwidth for mobile device 302 decreases to a level below that of mobile device 301.

As shown in the graph, both mobile device 301 and 302 continue to use bandwidth. Therefore, each device's projected bandwidth usage converges and both mobile devices are eventually allocated the same amount of bandwidth.

Figure 6B:
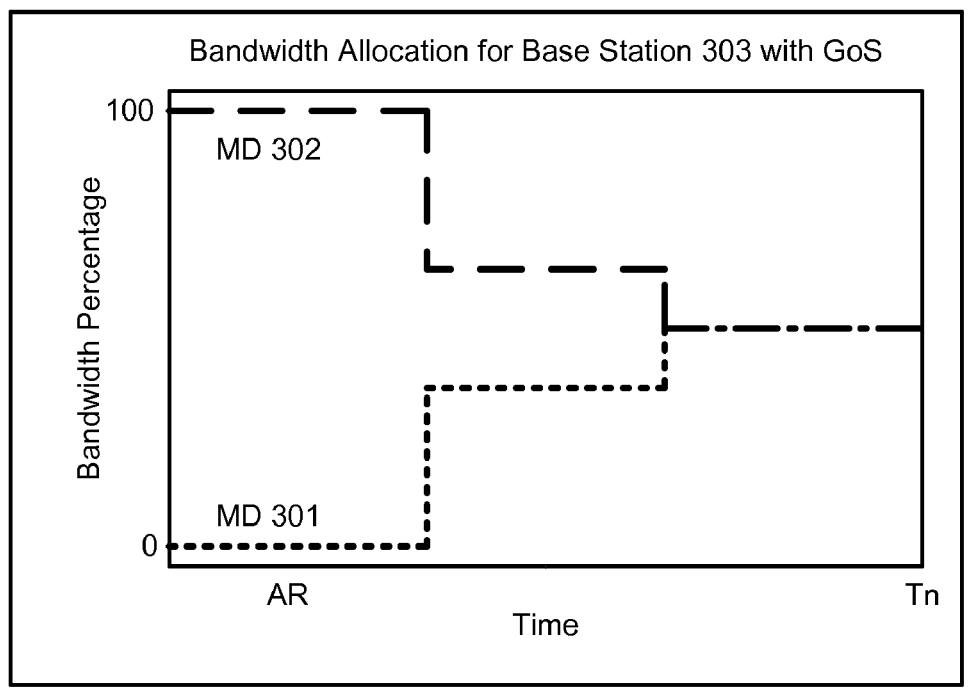
FIG. 6B illustrates a graph of allocated bandwidth using a proportional fairness algorithm and a grade of service factor.

FIG. 6B is a graph of an example of how the bandwidth of mobile device 301 and 302 is allocated based on a proportional fairness algorithm that also considers the GoS for each device. The graph is not meant to be exact as to the percentage of available bandwidth that is allocated to each mobile device. Each mobile device may receive more or less bandwidth than what is depicted in the graph. Additionally, the time axis is not shown to scale.

The time axis of the graph begins at the end of the initial time period and ends at a later point. The access request from mobile device 301 is transferred to bandwidth control system 305 at a time near the end of the initial time period (denoted by AR on the graph). In this example, mobile device 302 is exchanging data communications with base station 303 at the time the access request is transferred from mobile device 301 to bandwidth control system 305. Additionally, mobile device 302 has already been assigned a higher GoS than mobile device 301 using the steps described for FIG. 5.

Bandwidth allocation system first processes the access request based on the proportional fairness algorithm as described for FIG. 6A to determine the amount of bandwidth to allocate to mobile device 301. However, in this example, bandwidth control system 305 also considers the GoS for each device. Consequently, in this example, the higher GoS of mobile device 302 results in less of a decrease in bandwidth allocated to mobile device 302 than if bandwidth control system 305 were not to consider GoS. Moreover, if the GoS of mobile device 302 were even higher than the GoS of mobile device 301, then mobile device 301 would be allocated an even lower share of the available bandwidth.

As shown in the graph, both mobile device 301 and 302 continue to use bandwidth. Therefore, each device's projected bandwidth usage converges and both mobile devices are eventually allocated the same amount of bandwidth. Conversely, mobile device 301 may not continue to use data bandwidth. In that case, the next time mobile device 301 transfers a data access request, bandwidth will be allocated between mobile devices 301 and 302 in the same manner described above.

Figure 7:
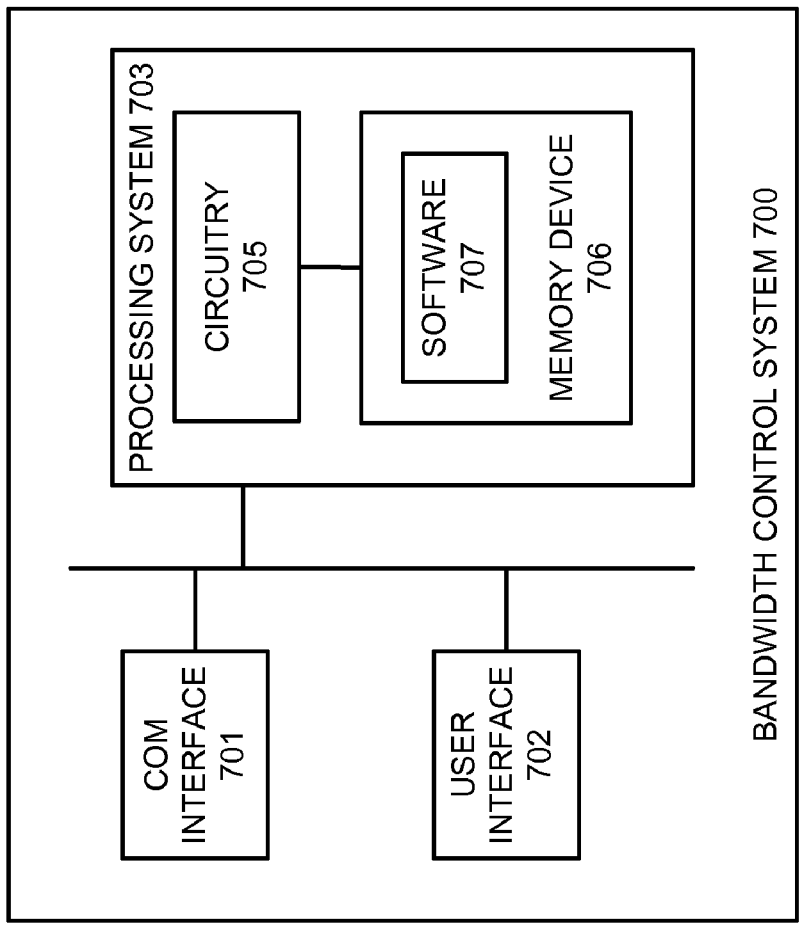
FIG. 7 illustrates a bandwidth allocation system.

FIG. 7 illustrates bandwidth control system 700. Bandwidth control system 700 is an example of bandwidth control systems 105 and 305, although alternative configurations may be used. Bandwidth control system 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. Communications interface 701 may receive access requests from mobile device 101 or 301 and transfer bandwidth allocation instructions.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate as described herein for bandwidth control system 105 and 305. In particular, operating software 707 directs processing system 703 to determine a quantity of transitions by a mobile device and allocate bandwidth for the mobile device based on the quantity of transitions, as described herein for bandwidth control systems 105 and 305. Specifically, operating software 707 directs processing system 703 to determine a quantity of dormancy transitions for mobile device 101 or 301 and determine a bandwidth allocation based on the quantity of dormancy transitions.

Referring back to FIG. 1, mobile communication device 101 comprises Radio Frequency (RF) communication circuitry and an antenna. The RF communication circuitry typically includes an amplifier, filter, modulator, and signal processing circuitry. Mobile communication device 101 may also include a user interface, memory device, software, processing circuitry, or some other communication components. Mobile communication device 101 may be a telephone, computer, e-book, mobile Internet appliance, wireless network interface card, media player, game console, or some other wireless communication apparatus—including combinations thereof.

Mobile communication device 102 comprises Radio Frequency (RF) communication circuitry and an antenna. The RF communication circuitry typically includes an amplifier, filter, modulator, and signal processing circuitry. Mobile communication device 101 may also include a user interface, memory device, software, processing circuitry, or some other communication components. Mobile communication device 101 may be a telephone, computer, e-book, mobile Internet appliance, wireless network interface card, media player, game console, or some other wireless communication apparatus—including combinations thereof.

Wireless access node 103 comprises RF communication circuitry and an antenna. The RF communication circuitry typically includes an amplifier, filter, RF modulator, and signal processing circuitry. Wireless access node 103 may also comprise a router, server, memory device, software, processing circuitry, cabling, power supply, network communication interface, structural support, or some other communication apparatus. Wireless access node 103 could be a base station, Internet access node, telephony service node, wireless data access point, or some other wireless communication system—including combinations thereof.

Wireless links 120 and 121 use the air or space as the transport media. Wireless links 120 and 121 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 122 uses metal, glass, air, space, or some other material as the transport media. Communication link 122 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 122 could be a direct link or may include intermediate networks, systems, or devices.

As illustrated in the description above, the proportional fairness algorithm may not always account for users who are engaging in excessive burst data usage, such as uncharacteristically frequent web page loads, or a burst data attack, such as a network ping attack. In these situations, the proportional fairness algorithm would allocate more bandwidth to the offending device and less to the other devices on the wireless access node that are functioning appropriately. To improve bandwidth allocation, offending devices can be identified based on how often the devices transition out of a dormant state to a non-dormant state. Bandwidth is allocated in a limited fashion to those devices in order to avoid over-allocation of bandwidth to very bursty users. In this manner, normal users of access node bandwidth are not denied bandwidth due to excessive burst data usage by others.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system comprising:
    exchanging communications with a mobile device over a wireless link during an initial period of time;
    determining a quantity of transitions by the mobile device from a dormant state during the initial period of time;
    assigning a grade of service factor to the mobile device based on the quantity of transitions that occurred during the initial period of time;
    receiving an access request from the mobile device to access the wireless link after the initial period of time;
    determining a bandwidth allocation on the wireless link for the mobile device based on the grade of service factor;
    exchanging data communications with the mobile device over the wireless link based on the bandwidth allocation.

2. The method of claim 1 wherein the transitions by the mobile device from a dormant state comprise transitions from the dormant state to an active state.

3. The method of claim 1 wherein the communications with the mobile device over the wireless link during the initial period of time comprise a plurality of previous access requests from the mobile device.

4. The method of claim 3 wherein the quantity of transitions by the mobile device from the dormant state during the initial period of time comprises the quantity of access requests received during the initial period of time.

5. The method of claim 1 wherein determining the bandwidth allocation is further based on a proportional fairness scheduling algorithm.

6. The method of claim 1 further comprising:
    comparing the quantity of transitions to a plurality of transition thresholds, wherein each transition threshold has an associated grade of service factor, and
    if the quantity of transitions satisfies at least one transition threshold of the plurality of transition thresholds, selecting the grade of service factor that coincides with the transition threshold of the at least one transition thresholds that has the highest value.

7. A communication system comprising:
    an access node configured to exchange communications with a mobile device over a wireless link during an initial period of time;
    a bandwidth control system configured to determine a quantity of transitions by the mobile device from a dormant state during the initial period of time, assign a grade of service factor to the mobile device based on the quantity of transitions that occurred during the initial period of time, receive an access request from the mobile device to access the wireless link after the initial period of time, and determine a bandwidth allocation on the wireless link for the mobile device based on the grade of service factor; and
    the access node further configured to exchange data communications with the mobile device over the wireless link based on the bandwidth allocation.

8. The communication system of claim 7 wherein the transitions by the mobile device from a dormant state comprise transitions from the dormant state to an active state.

9. The communication system of claim 7 wherein the communications with the mobile device over the wireless link during the initial period of time comprise a plurality of previous access requests from the mobile device.

10. The communication system of claim 9 wherein the quantity of transitions by the mobile device from the dormant state during the initial period of time comprise the quantity of access requests received during the initial period of time.

11. The communication system of claim 7 wherein the bandwidth control system is further configured to determine the bandwidth allocation based on a proportional fairness scheduling algorithm.

12. The communication system of claim 7 wherein the bandwidth control system is further configured to compare the quantity of transitions to a plurality of transition thresholds, wherein each transition threshold has an associated grade of service factor, and, if the quantity of transitions satisfies at least one transition threshold of the plurality of transition thresholds, selecting the grade of service factor that coincides with the transition threshold of the at least one transition thresholds that has the highest value.

13. A method of operating a bandwidth control system comprising:
    determining a quantity of transitions by a mobile device from a dormant state during an initial period of time, during which the mobile device exchanges communications with a wireless access node over a wireless link;
    assigning a grade of service factor to the mobile device based on the quantity of transitions that occurred during the initial period of time;
    receiving an access request from the mobile device to access the wireless link after the initial period of time;
    determining a bandwidth allocation on the wireless link for the mobile device based on the grade of service factor; and
    transferring an instruction indicating the bandwidth allocation, after which the mobile device exchanges communications with the wireless access node over the wireless link based on the bandwidth allocation.

14. The method of claim 13 wherein the transitions by the mobile device from a dormant state comprises transitions from the dormant state to an active state.

15. The method of claim 13 wherein the communications exchanged by the mobile device with the wireless access node comprise a plurality of previous access requests from the mobile device.

16. The method of claim 15 wherein the quantity of transitions by the mobile device from the dormant state during the initial period of time comprise the quantity of access requests received during the initial period of time.

17. The method of claim 13 wherein determining the bandwidth allocation further based on a proportional fairness scheduling algorithm.

18. The method of claim 13 further comprising:
    comparing the quantity of transitions to a plurality of transition thresholds, wherein each transition threshold has an associated grade of service factor, and
    if the quantity of transitions satisfies at least one transition threshold of the plurality of transition thresholds, selecting the grade of service factor that coincides with the transition threshold of the at least one transition thresholds that has the highest value.

\* \* \* \* \*